United States Patent
Yuan et al.

(10) Patent No.: US 11,557,284 B2
(45) Date of Patent: Jan. 17, 2023

(54) COGNITIVE ANALYSIS FOR SPEECH RECOGNITION USING MULTI-LANGUAGE VECTOR REPRESENTATIONS

(71) Applicant: International Business Machines Corporation, Armonk, NY (US)

(72) Inventors: Zhong Fang Yuan, Xi'an (CN); Kun Yan Yin, Ningbo (CN); He Li, Beijing (CN); Tong Liu, Xi'an (CN); Hai Ji, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 16/733,868

(22) Filed: Jan. 3, 2020

(65) Prior Publication Data

US 2021/0210077 A1    Jul. 8, 2021

(51) Int. Cl.
*G10L 15/18* (2013.01)
*G10L 15/22* (2006.01)
*G10L 19/00* (2013.01)
*G10L 15/00* (2013.01)

(52) U.S. Cl.
CPC ........ *G10L 15/1815* (2013.01); *G10L 15/005* (2013.01); *G10L 15/22* (2013.01); *G10L 19/00* (2013.01)

(58) Field of Classification Search
CPC ... G10L 15/005; G10L 15/1815; G10L 15/22; G10L 19/00; G10L 15/1822; G06F 40/30
See application file for complete search history.

(56) References Cited

U.S. PATENT DOCUMENTS

| | | | |
|---|---|---|---|
| 6,763,331 B2 | 7/2004 | Wakita | |
| 7,702,500 B2 | 4/2010 | Blaedow | |
| 9,665,565 B2 | 5/2017 | Ma | |
| 9,767,186 B2 * | 9/2017 | Bhandari | G06F 16/338 |

(Continued)

FOREIGN PATENT DOCUMENTS

| | | |
|---|---|---|
| CN | 104516986 A | 4/2015 |
| CN | 103034627 B | 5/2016 |
| CN | 109145290 A | 1/2019 |

OTHER PUBLICATIONS

Choi, et al., "Context-DependentWord Representation for Neural Machine Translation", arXiv:1607.00578v1 [cs CL] Jul. 3, 2016, 13 pages, <https://arxiv.org/pdf/1607.00578.pdf>.

(Continued)

*Primary Examiner* — Angela A Armstrong
(74) *Attorney, Agent, or Firm* — Michael A. Petrocelli

(57) ABSTRACT

A method, system and computer program product for speech recognition using multiple languages includes receiving, by one or more processors, an input from a user, the input includes a sentence in a first language. The one or more processors translate the sentence to a plurality of languages different than the first language, and create vectors associated with the plurality of languages, each vector includes a representation of the sentence in each of the plurality of languages. The one or more processors calculate eigenvectors for each vector associated with a language in the plurality of languages, and based on the calculated eigenvectors, a score is assigned to each of the plurality of languages according to a relevance for determining a meaning of the sentence.

18 Claims, 8 Drawing Sheets

(56) References Cited

U.S. PATENT DOCUMENTS

| | | |
|---|---|---|
| 10,255,271 B2 | 4/2019 | Alba |
| 2015/0052140 A1 | 2/2015 | Miyahara |
| 2018/0011843 A1* | 1/2018 | Lee .......................... G10L 15/02 |
| 2020/0097554 A1* | 3/2020 | Rezagholizadeh .. G06N 3/0472 |

OTHER PUBLICATIONS

Mell et al., "The NIST Definition of Cloud Computing", National Institute of Standards and Technology, Special Publication 800-145, Sep. 2011, 7 pages.

* cited by examiner

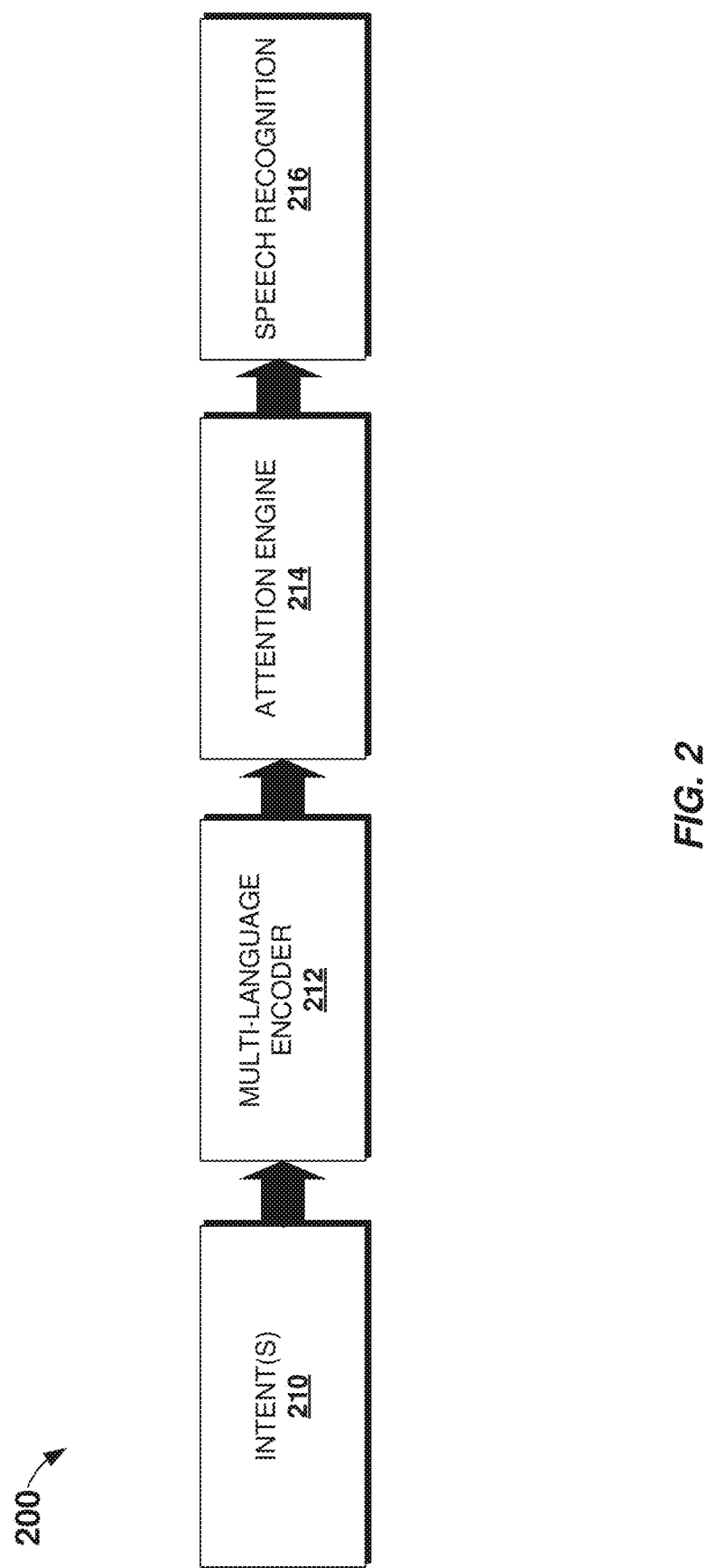

COGNITIVE ANALYSIS FOR SPEECH RECOGNITION USING MULTI-LANGUAGE VECTOR REPRESENTATIONS

BACKGROUND

The present invention generally relates to the field of natural language processing, and more particularly to a method, system and computer program product for speech recognition using multiple languages.

Intent recognition is a fundamental part of conversational systems. Intent recognition algorithms facilitate robot-human interaction by predicting or understanding what a user wants the system to do, and how the system can offer help. Intent recognition algorithms are used in a wide variety of tasks including, for example, search engines.

In advanced conversational systems, complex conversations can occur between machines (e.g., computers, robots, etc.) and users. In these cases, intent recognition algorithms calculate a degree of similarity between different sentences typically within the same language. The accuracy of the intent recognition algorithms determines the performance of the conversational system. Typical intent recognition algorithms select a sentence with the highest degree of similarity as the correct sentence (i.e., the sentence matching the user's intent). Specifically, the algorithm determines how close two pieces of text are in surface closeness (lexical similarity) and meaning (semantic similarity). Lexical or word similarity is often used to achieve semantic similarity. However, in some languages, sentences with a high degree of (lexical or word) similarity can have completely opposite meanings. For example, in the Chinese language, the sentences, translated into English, "Do not give up" and "Have to give up" have a high degree of similarity (approximately 94%). This situation may lead artificial intelligence (AI) systems using natural language processing to choose the wrong sentence thereby reducing the accuracy of the conversational system. Therefore, methods and systems for improved speech recognition would be desirable.

SUMMARY

Shortcomings of the prior art are overcome and additional advantages are provided through the provision of a method for speech recognition using multiple languages. The method includes receiving, by one or more processors, an input from a user, the input includes a sentence in a first language. The one or more processors translate the sentence to a plurality of languages different than the first language, and create vectors associated with the plurality of languages, each vector includes a representation of the sentence in each of the plurality of languages. The one or more processors calculate eigenvectors for each vector associated with a language in the plurality of languages, and based on the calculated eigenvectors, a score is assigned to each of the plurality of languages according to a relevance for determining a meaning of the sentence.

Another embodiment of the present disclosure provides a computer program product for speech recognition using multiple languages, based on the method described above.

Another embodiment of the present disclosure provides a computer system for speech recognition using multiple languages, based on the method described above.

BRIEF DESCRIPTION OF THE DRAWINGS

The following detailed description, given by way of example and not intended to limit the invention solely thereto, will best be appreciated in conjunction with the accompanying drawings, in which:

FIG. 2 is a block diagram depicting components of a system for speech recognition using multiple languages, according to an embodiment of the present disclosure;

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention generally relates to the field of natural language processing (NLP), and more particularly to a method, system and computer program product for speech recognition using multiple languages. The following described exemplary embodiments provide a system, method, and computer program product to, among other things, determining semantic differences between two or more phrases, in a first language, that include substantially the same words or characters by translating such phrases into different languages in which the semantic difference can be easily determined. Specifically, the proposed embodiments take advantage of the fact that similarly written phrases in one language (i.e., include the same or substantially the same words) can have different meaning, but in another language, the same phrases can be written in a completely different form that helps conversational systems to identify the semantic difference between them. This may be overlooked by traditional speech recognition methods which rely on lexical similarity to determine meaning (semantic similarity). Thus, the proposed system determines a higher likelihood of what the user or speaker intended.

The proposed embodiments describe a three-step process that includes: 1) a multiple language intent recognition component in which an encoder extracts information from a plurality of languages to represent the intents; 2) an attention engine that organizes the multiple languages according to a relevance for identifying the intent; and 3) an intent recognition network including vectors trained for intent recognition. Therefore, the present embodiments have the capacity to improve the technical field of natural language processing by simultaneously analyzing information from multiple languages to determine a degree of similarity between two or more phrases in a another language thereby improving the accuracy of conversational systems for identifying a user's intent.

Figure 1:
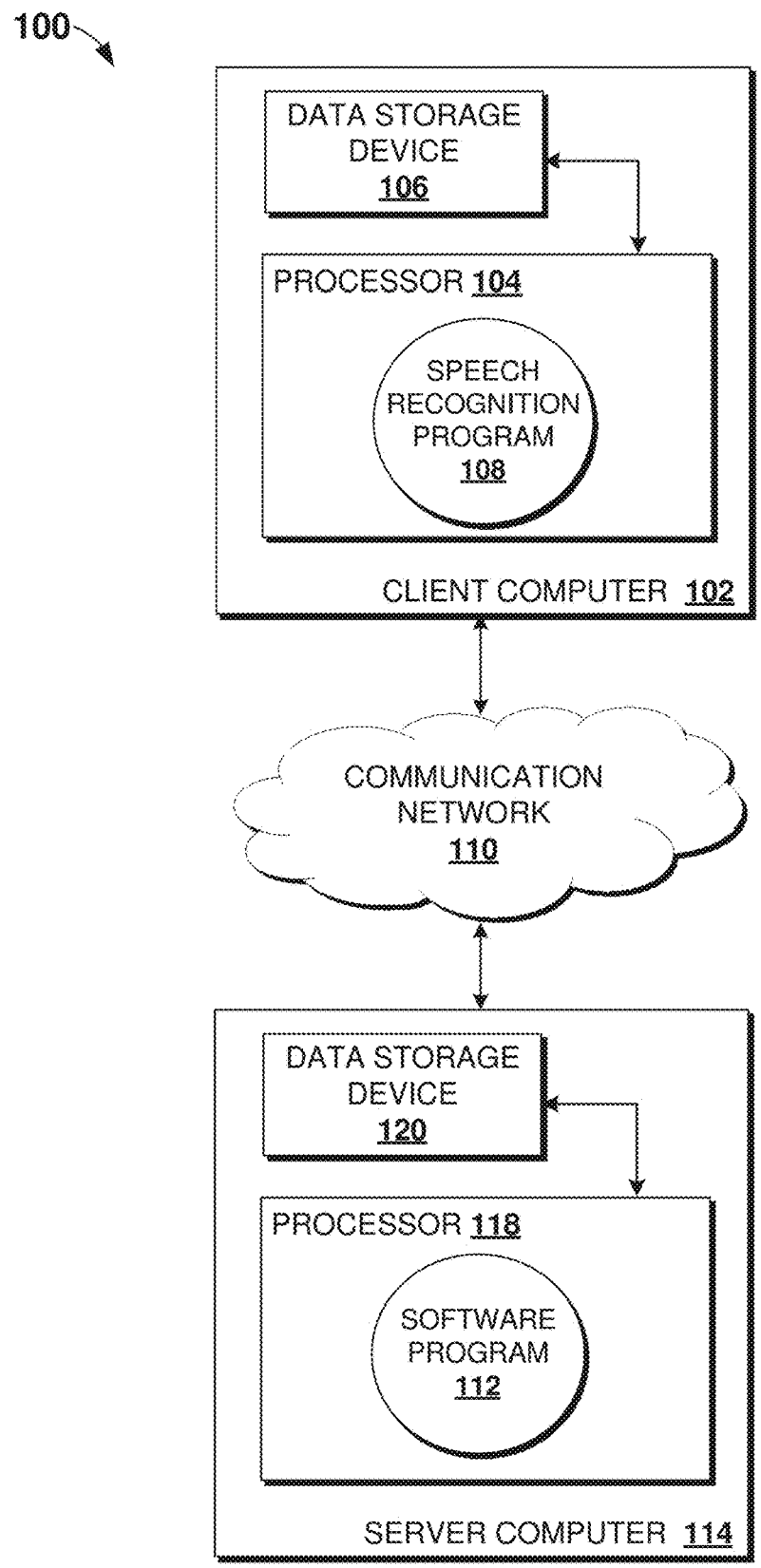
FIG. 1 is a block diagram illustrating a networked computer environment, according to an embodiment of the present disclosure.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a client computer 102 and a communication network 110. The client computer 102 may include a processor 104 and a data storage device 106 that is enabled to run a speech recognition program 108. Client computer 102 may be, for example, a mobile device, a telephone (including smartphones), a personal digital assistant, a netbook, a laptop computer, a tablet computer, a desktop computer, or any type of computing devices capable of accessing a network.

The networked computer environment 100 may also include a server computer 114 with a processor 118 and a data storage device 120 that is enabled to run a software program 112. In some embodiments, server computer 114 may be a resource management server, a web server or any other electronic device capable of receiving and sending data. In another embodiment, server computer 114 may represent a server computing system utilizing multiple computers as a server system, such as in a cloud computing environment.

The speech recognition program 108 running on client computer 102 may communicate with the software program 112 running on server computer 114 via the communication network 110. As will be discussed with reference to FIG. 4, client computer 102 and server computer 114 may include internal components and external components.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a cellular or mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Referring now to FIG. 2, a block diagram depicting components of a speech recognition system 200 capable of analyzing information from multiple languages is shown, according to an embodiment of the present disclosure. The speech recognition system 200 includes a multi-language encoder module 212 which is capable of analyzing a plurality of different languages to represent intents 210.

Specifically, the multi-language encoder module 212 creates vector representations of a sentence in different languages. According to an embodiment, the multi-language encoder module 212 includes a translation engine that uses an encoder-decoder method well known in the art. The multi-language encoder module 212 uses the encoder part of the model to read a source statement or user's input and construct an intermediate vector including a sequence of numbers representing a meaning of a sentence within the user's input. The intermediate vector is then converted to a target language by the decoder part of the model. Each intermediate vector defined by the multi-language encoder module 212 denotes a semantic representation of a language in a vector space, as described below with reference to FIG. 2A.

Figure 2A:
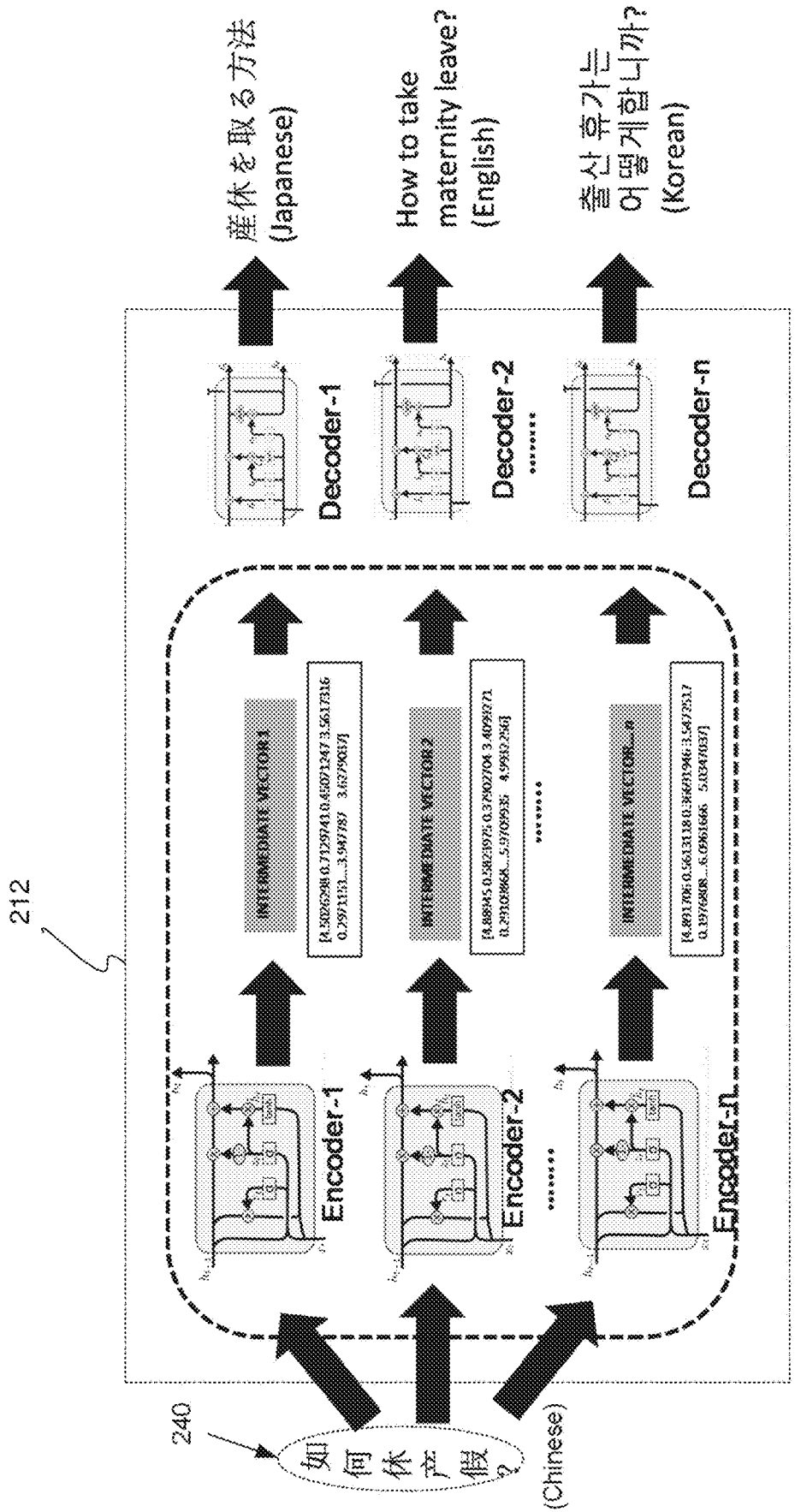
FIG. 2A is an exemplary implementation of a multi-language encoder module of the system for speech recognition using multiple languages, according to an embodiment of the present disclosure.

FIG. 2A includes an exemplary implementation of the multi-language encoder module 212. As shown in FIG. 2A, a sentence 240 is received by the multi-language encoder module 212. In this example, the sentence 240 is in the Chinese language. The intent 210 (FIG. 2) of a user providing the sentence 240 will be identified by the speech recognition system 200. In the Chinese language sentence 240 (如何休产假) includes almost identical characters than the expression 如何休陪产假 which has a completely different meaning. Sentence 240 (如何休产假) translated to English is "How to take maternity leave?" while the analogous expression 如何 休陪产假 translated to English is "How to take paternity leave?". Thus, it could be easy for a chatbot, or any other conversational system, to confuse the translation by the similarity between these two phrases and provide an erroneous response.

Accordingly, traditional speech recognition systems may compare both phrases and select the second instance ("how to take paternity leave") as the correct match which results in an erroneous output. Therefore, the multi-language encoder module 212 takes sentence 240 and creates a plurality of intermediate vectors 1, 2 . . . n to represent the meaning of sentence 240. Each intermediate vector is then converted by a corresponding decoder to a different language. In the example of FIG. 2A, sentence 240 is translated to Japanese, English and Korean languages. It should be noted that the multi-language encoder module 212 may translate sentence 240 to many different languages.

With continue reference to FIG. 2, output from the multi-language encoder module 212 is received by an attention engine 214. The attention engine 214 obtains eigenvectors for each received intermediate vector associated with each identified language in the multi-language encoder module 212, and based on the obtained eigenvectors organizes each identified language according to a relevance or importance for identifying the user's intent. It should be noted that interpreting word embedding using eigenvector analysis is standard and well known in NLP tasks.

Figure 2B:
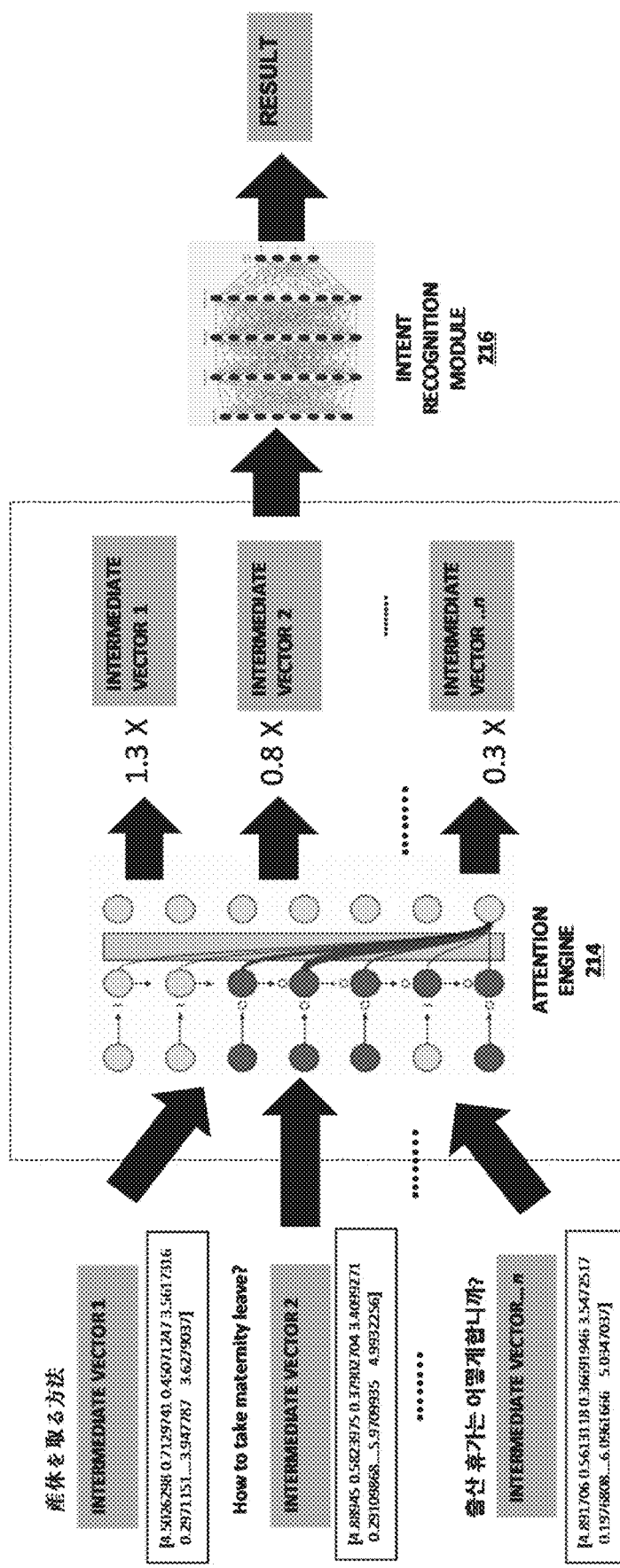
FIG. 2B is an exemplary implementation of an attention engine and intent recognition module of the system for speech recognition using multiple languages, according to an embodiment of the present disclosure.

The obtained eigenvectors are then used as input for a speech recognition module 216. FIG. 2B details the functioning of the attention engine 214 and speech recognition module 216. As explained above, the attention engine 214 determines proportional components of each different semantic vector (e.g., intermediate vectors 1, 2, . . . n) which are subsequently received as final input by the speech recognition module 216. The speech recognition module 216 receives all determined vectors including a mapping of words or phrases from different languages which may form an intent recognition network that can be used to train the speech recognition system 200, thereby improving an accuracy of the speech recognition system 200.

Steps of a method for automatically determining speech recognition for a user based on the speech recognition system 200 will be described in detail below.

Figure 3:
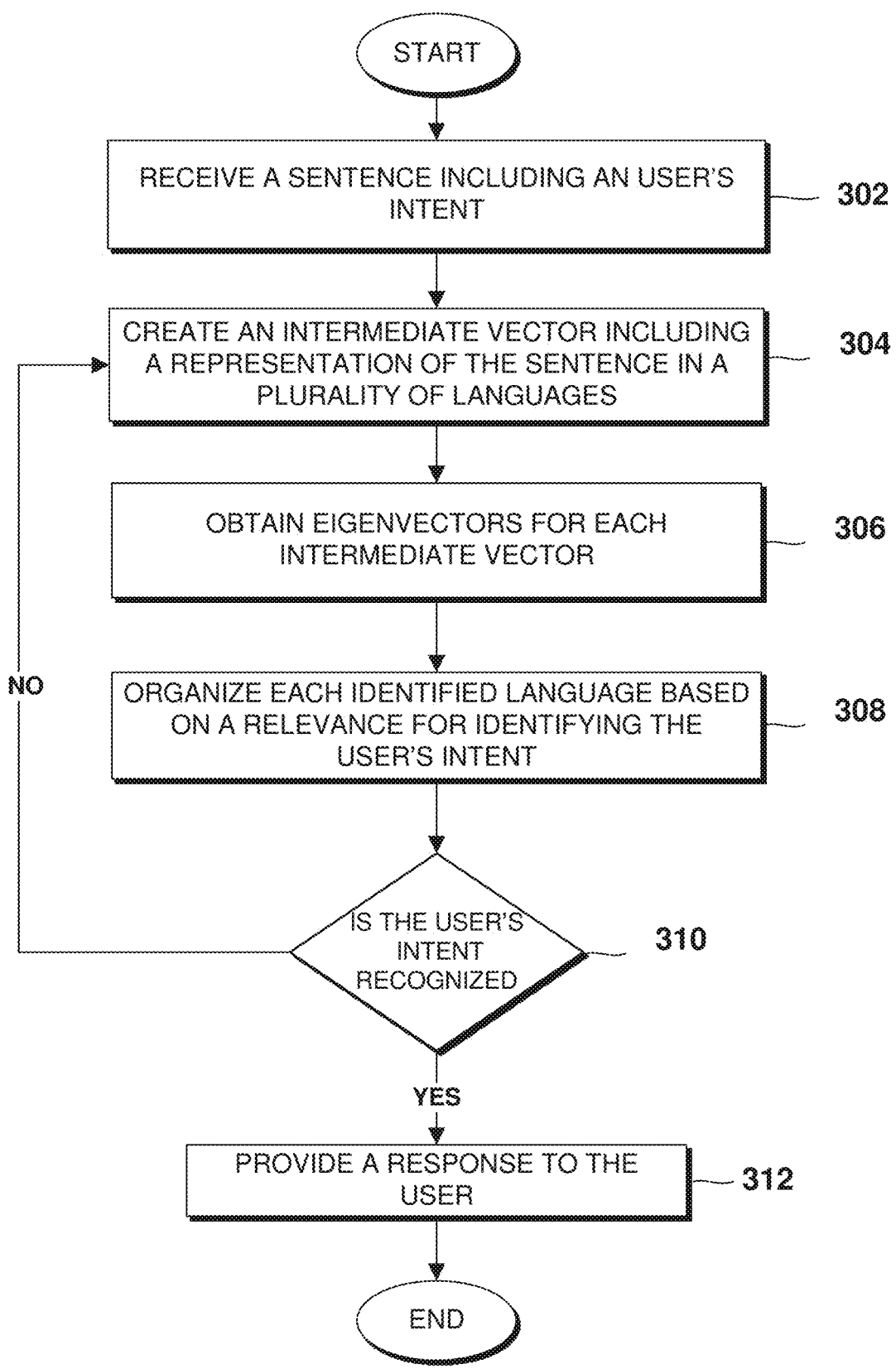
FIG. 3 is a flowchart illustrating the steps of a method for speech recognition using multiple languages, according to an embodiment of the present disclosure.

Referring now to FIG. 3, a flowchart illustrating the steps of a method for speech recognition using multiple languages, is shown, according to an embodiment of the present disclosure.

The process starts at step 302 in which a user's input is received by a conversational system (e.g., a chatbot) in which the proposed speech recognition system 200 (FIG. 2) is implemented. The user's input includes a user's query made of a sentence or phrase. As explained in FIG. 2, the sentence may be in a first language. In that first language, the sentence may be written similarly to another sentence, but have a completely different meaning. Traditional intent recognition system may ignore the semantic difference between the two sentences and provide a response to the user based on the written similarity. This may cause an erroneous response to the user's query (i.e., failure to recognize what the user intended).

To reduce the likelihood of such problems, the proposed speech recognition system 200 (FIG. 2) at step 304 creates a plurality of intermediate vectors, where each intermediate vector is a representation of the sentence in a different language. Basically, the sentence is translated into a plurality of languages and each language is mapped to a vector. The process continues at step 306 in which eigenvectors are obtained for each intermediate vector in the plurality of intermediate vectors. Here, scores are assigned to each language represented by a vector. Based on the assigned scores, the different languages are organized, at step 308, according to their relevance in determining a meaning of the initial sentence (i.e., the user's intent). The language with the highest score is selected as the best match for the user's intent. Stated differently, the language with the highest score provides the clearest representation of the user's intent.

For example, in an embodiment in which the sentence provided by the user includes the question, in the Spanish language, "Dónde está el banco?" (Where is the bank?, in the English language). In the Spanish language, this phrase is written exactly as the phrase "Where is the bench?" in the English language. Specifically, in the Spanish language, the English phrases "Where is the bank?" and "Where is the bench?" are written in the same way. However, in the English language they are written in a completely different way. The proposed speech recognition system 200 (FIG. 2) translate the sentence to many different languages and selects the one that provides the best description of the user's intent. In the example, the sentence in the Spanish language "Dónde está el banco?" can be ambiguous, but in the English language there is a clear semantic difference between the phrases "Where is the bank?" and "Where is the bench?". This difference is used to improve the accuracy of the speech recognition system 200 (FIG. 2). Thus, the method of FIG. 3 increases the likelihood of determining what the user or speaker intended. It should be noted that more than one language can be used to determine the user's intent.

At step 310, based on the user's intent being recognized, a response is provided to the user and the process ends. If at step 310, the user's intent has not been recognized, the process may return to step 304.

Therefore, the described embodiments provide a method, system, and computer program product for automatically recognizing a user's speech using information obtained from different languages. The proposed embodiments determine semantic differences between analogous phrases in a given language by translating such phrases into different languages and identifying a user's intent based on the language in which the semantic difference is evident.

Figure 4:
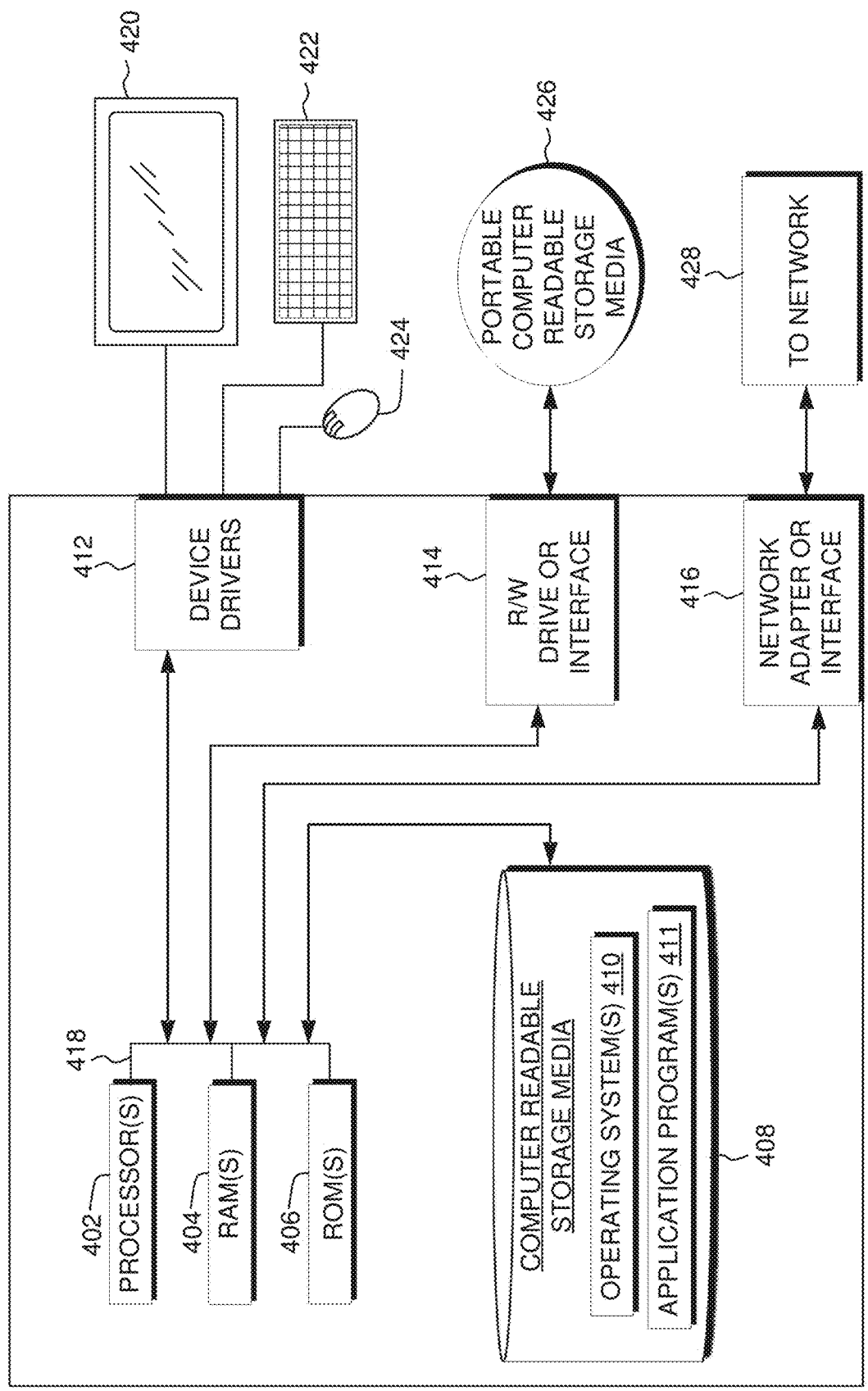
FIG. 4 is a block diagram of internal and external components of a computer system, according to an embodiment of the present disclosure.

Referring now to FIG. 4, a block diagram of components of client computer 102 and server computer 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Client computer 102 and server computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 414 to read from and write to one or more portable computer readable storage media 426. Application programs 411 on client computer 102 and server computer 114 may be stored on one or more of the portable computer readable storage media 426, read via the respective R/W drive or interface 414 and loaded into the respective computer readable storage media 408.

Client computer 102 and server computer 114 may also include a network adapter or interface 416, such as a TCP/IP adapter card or wireless communication adapter (such as a 4G wireless communication adapter using OFDMA technology) for connection to a network 428. Application programs 411 on client computer 102 and server computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Client computer 102 and server computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
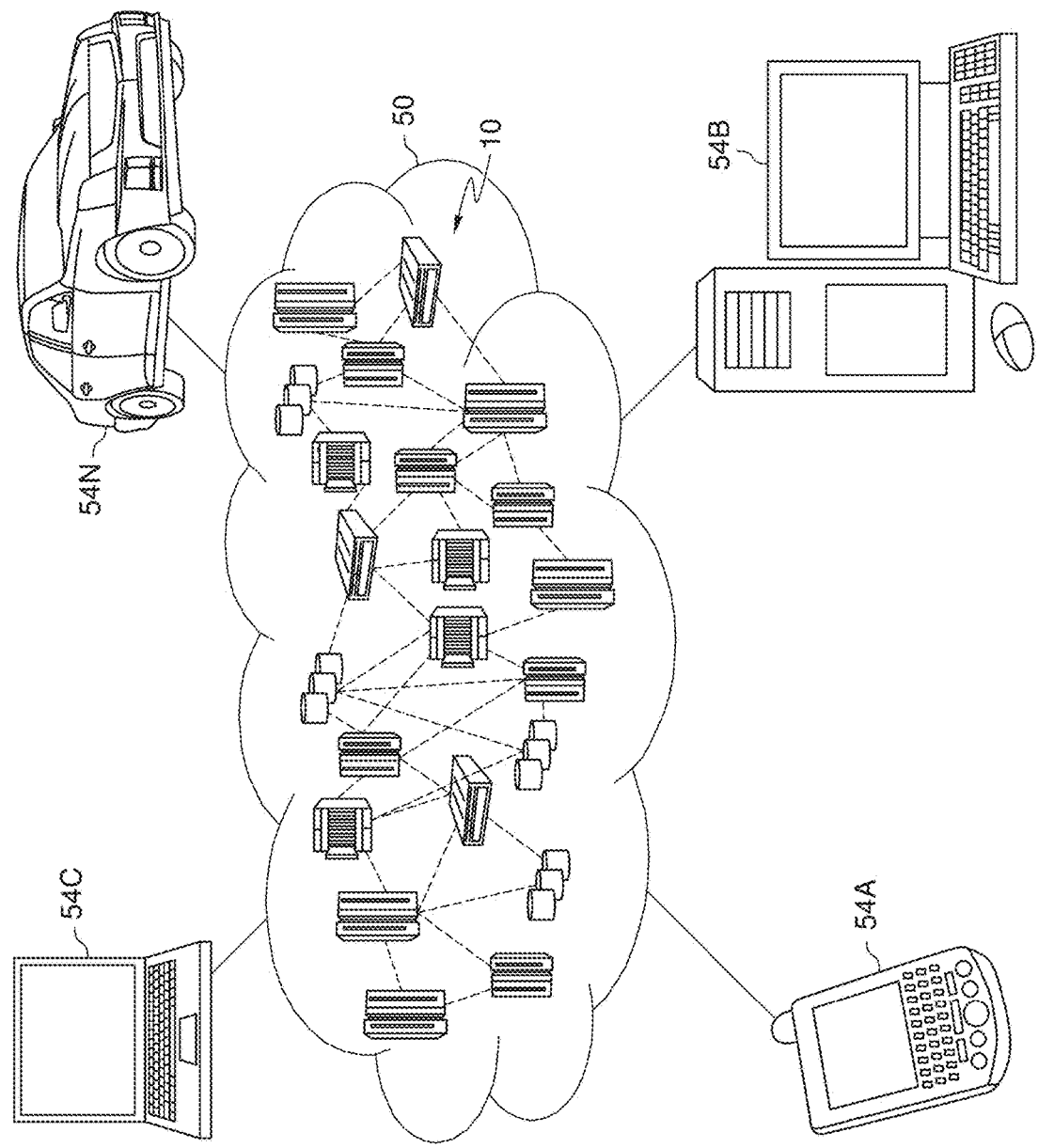
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
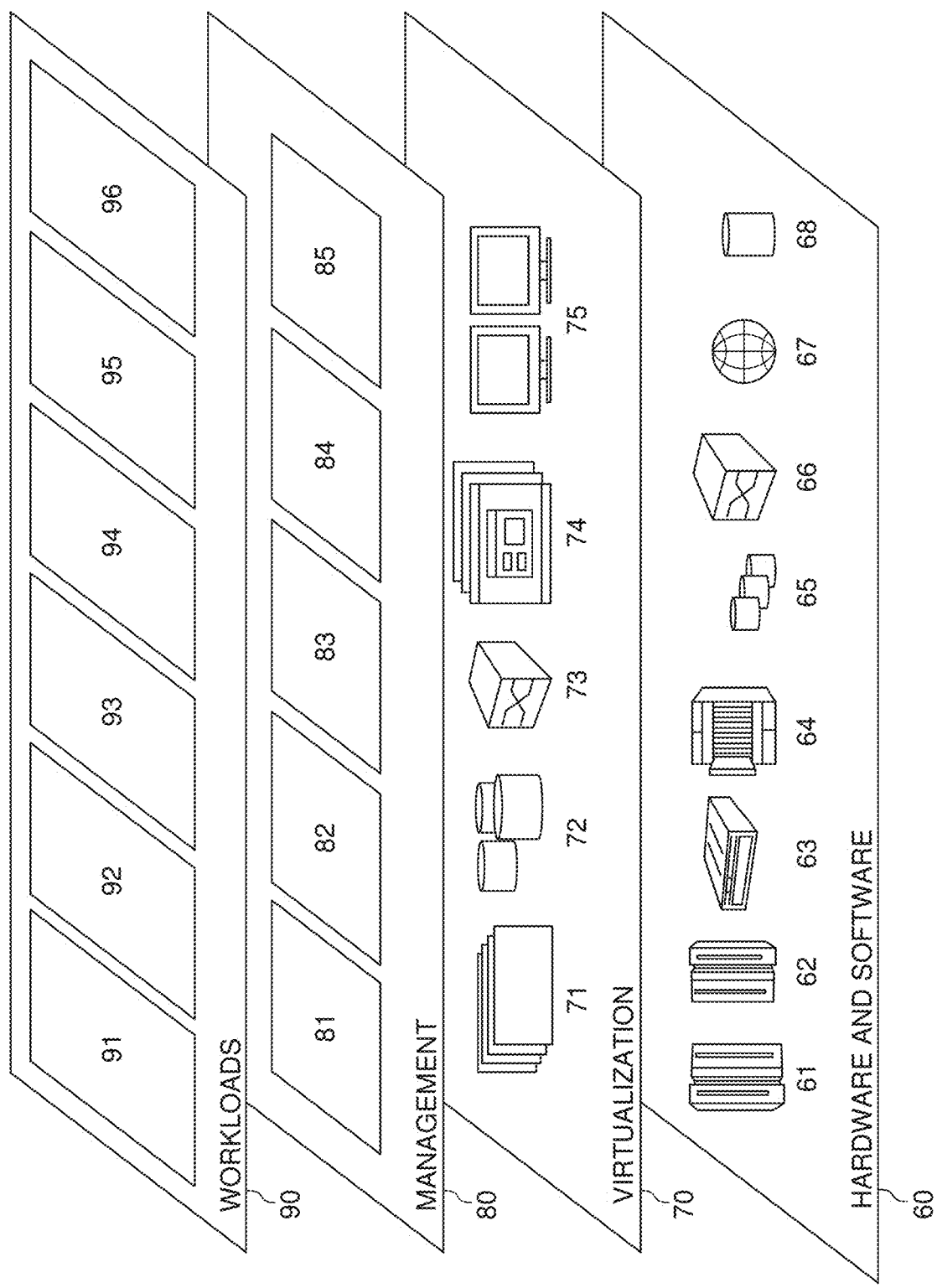
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for automatic intent recognition using multiple languages 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for speech recognition, comprising:
   receiving, by one or more processors, an input from a user, the input including a query associated with a user's intent, the query including a sentence in a first language;
   determining, by the one or more processors, a degree of similarity between the sentence in the first language and at least one another sentence in the first language;
   responsive to the sentence in the first language being written similarly to the at least one another sentence in the first language, encoding, by the one or more processors, the sentence in the first language to generate a plurality of intermediate vectors representing a meaning of the sentence in the first language;
   decoding, by the one or more processors, each intermediate vector to a plurality of languages different from the first language, each decoded intermediate vector including a semantic representation of the sentence in each of the plurality of languages for determining the meaning of the sentence in the first language that matches the user's intent in the query;
   calculating, by the one or more processors, eigenvectors for each decoded intermediate vector associated with a language in the plurality of languages;
   based on the calculated eigenvectors, assigning, by the one or more processors, a score to each of the plurality of languages according to a relevance for determining the meaning of the sentence in the first language that matches the user's intent;

selecting, by the one or more processors, a sentence in a language from the plurality of languages having a highest score for determining the meaning of the sentence in the first language that matches the user's intent; and based on a meaning of the selected sentence matching the user's intent, using, by the one or more processors, the sentence with the highest score to identify the meaning of the sentence in the first language matching the user's intent, and communicating the meaning of the sentence in the first language to a user device.

2. The method of claim 1, wherein the selected sentence in the language from the plurality of languages with the highest score is semantically similar to the sentence in the first language.

3. The method of claim 2, wherein the selected sentence in the language from the plurality of languages with the highest score matches an intent of the sentence.

4. The method of claim 1, wherein the sentence in the first language is written similarly to a second sentence in the same language but has a different meaning.

5. The method of claim 1, wherein the sentence in the first language translated to a second language selected from the plurality of languages is written in a different way than the sentence in the first language but are semantically similar.

6. The method of claim 1, wherein the creating vectors associated with the plurality of languages is done using an encoder-decoder method.

7. A computer system for intent recognition, comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

receiving, by one or more processors, an input from a user, the input including a query associated with a user's intent, the query including a sentence in a first language;

determining, by the one or more processors, a degree of similarity between the sentence in the first language and at least one another sentence in the first language;

responsive to the sentence in the first language being written similarly to the at least one another sentence in the first language, encoding, by the one or more processors, the sentence in the first language to generate a plurality of intermediate vectors representing a meaning of the sentence in the first language;

decoding, by the one or more processors, each intermediate vector to a plurality of languages different from the first language, each decoded intermediate vector including a semantic representation of the sentence in each of the plurality of languages for determining the meaning of the sentence in the first language that matches the user's intent in the query;

calculating, by the one or more processors, eigenvectors for each decoded intermediate vector associated with a language in the plurality of languages;

based on the calculated eigenvectors, assigning, by the one or more processors, a score to each of the plurality of languages according to a relevance for determining the meaning of the sentence in the first language that matches the user's intent;

selecting, by the one or more processors, a sentence in a language from the plurality of languages having a highest score for determining the meaning of the sentence in the first language that matches the user's intent; and based on a meaning of the selected sentence matching the user's intent, using, by the one or more processors, the sentence with the highest score to identify the meaning of the sentence in the first language matching the user's intent, and communicating the meaning of the sentence in the first language to a user device.

8. The computer system of claim 7, wherein the selected sentence in the language from the plurality of languages with the highest score is semantically similar to the sentence in the first language.

9. The computer system of claim 8, wherein the selected sentence in the language from the plurality of languages with the highest score matches an intent of the sentence.

10. The computer system of claim 7, wherein the sentence in the first language is written similarly to a second sentence in the same language but has a different meaning.

11. The computer system of claim 7, wherein the sentence in the first language translated to a second language selected from the plurality of languages is written in a different way than the sentence in the first language but are semantically similar.

12. The computer system of claim 7, wherein the creating vectors associated with the plurality of languages is done using an encoder-decoder method.

13. A computer program product for intent recognition, comprising:
a computer readable storage medium having program instructions embodied therewith, wherein the computer readable storage medium is not a transitory signal per se, the program instructions executable by a device to cause the device to perform a method comprising:

receiving, by one or more processors, an input from a user, the input including a query associated with a user's intent, the query including a sentence in a first language;

determining, by the one or more processors, a degree of similarity between the sentence in the first language and at least one another sentence in the first language;

responsive to the sentence in the first language being written similarly to the at least one another sentence in the first language, encoding, by the one or more processors, the sentence in the first language to generate a plurality of intermediate vectors representing a meaning of the sentence in the first language;

decoding, by the one or more processors, each intermediate vector to a plurality of languages different from the first language, each decoded intermediate vector including a semantic representation of the sentence in each of the plurality of languages for determining the meaning of the sentence in the first language that matches the user's intent in the query;

calculating, by the one or more processors, eigenvectors for each decoded intermediate vector associated with a language in the plurality of languages;

based on the calculated eigenvectors, assigning, by the one or more processors, a score to each of the plurality of languages according to a relevance for determining the meaning of the sentence in the first language that matches the user's intent;

selecting, by the one or more processors, a sentence in a language from the plurality of languages having a highest score for determining the meaning of the sentence in the first language that matches the user's intent; and based on a meaning of the selected sentence matching the user's intent, using, by the one or more processors, the sentence with the highest score to identify the meaning of the sentence in the first language matching the user's intent, and communicating the meaning of the sentence in the first language to a user device.

14. The computer program product of claim 13, wherein the selected sentence in the language from the plurality of languages with the highest score is semantically similar to the sentence in the first language.

15. The computer program product of claim 14, wherein the selected sentence in the language from the plurality of languages with the highest score matches an intent of the sentence.

16. The computer program product of claim 13, wherein the sentence in the first language is written similarly to a second sentence in the same language but has a different meaning.

17. The computer program product of claim 13, wherein the sentence in the first language translated to a second language selected from the plurality of languages is written in a different way than the sentence in the first language but are semantically similar.

18. The computer program product of claim 15, wherein the creating vectors associated with the plurality of languages is done using an encoder-decoder method.

\* \* \* \* \*